United States Patent [19]

Iwatani et al.

[11] Patent Number: 5,563,497
[45] Date of Patent: Oct. 8, 1996

[54] CONTROL DEVICE FOR AC GENERATOR

[75] Inventors: Shiro Iwatani; Keiichi Komurasaki; Tatsuki Kohwa, all of Himeji, Japan

[73] Assignee: Mitsubishi Denki Kabushiki Kaisha, Tokyo, Japan

[21] Appl. No.: 424,049

[22] Filed: Apr. 19, 1995

[30] Foreign Application Priority Data

Apr. 27, 1994 [JP] Japan .................................. 6-089810

[51] Int. Cl.⁶ ........................................................ H02J 7/14
[52] U.S. Cl. ........................................... 322/99; 322/28
[58] Field of Search ............................................ 322/28, 99

[56] References Cited

U.S. PATENT DOCUMENTS

| | | | |
|---|---|---|---|
| 4,315,205 | 2/1982 | Mori et al. | 322/99 |
| 4,316,134 | 2/1982 | Balan et al. | 322/99 |
| 4,379,990 | 4/1983 | Sivers et al. | 322/99 |
| 4,812,732 | 3/1989 | Iwatani | 322/99 |
| 5,184,060 | 2/1993 | Iwatani | 322/99 |

FOREIGN PATENT DOCUMENTS 180336  11/1982  Japan .

*Primary Examiner*—Steven L. Stephan
*Assistant Examiner*—Nicholas Ponomarenko
*Attorney, Agent, or Firm*—Sughrue, Mion, Zinn, Macpeak & Seas

[57] ABSTRACT

A control device for an AC generator having an armature coil and a field coil includes a rectifier for rectifying an AC output of the AC generator, which is driven by an engine, to excite the field coil. A storage battery is adapted to be charged by the rectified output of the AC generator rectified by the rectifier for supplying power to the field coil when the engine is started. A switching element switches over a connecting condition of the storage battery in such a manner that the storage battery is connected through the rectifier to the field coil to supply power to the field coil when the engine is started, the switching element being connected to an AC output of the AC generator for supplying the AC output voltage of the AC generator as a drive voltage to the second switching element. An output-voltage regulating circuit detects an AC output voltage of the AC generator and for intermittently controlling a field current to the field coil to regulate the AC output voltage of the AC generator to a predetermined value. An indicating lamp is connected between the switching element and the storage battery for indicating a state of electricity generation of the AC generator. An indicating-lamp control circuit turns on and off the indicating lamp based on the state of electricity generation of the AC generator.

3 Claims, 3 Drawing Sheets

CONTROL DEVICE FOR AC GENERATOR

BACKGROUND OF THE INVENTION

1. Field of the Invention

The present invention relates to a control device for an AC generator.

2. Description of the Related Art

FIG. 3 is a circuit diagram of a conventional control device for an AC generator in the form of a vehicular AC generator. This control device comprises a rectifier 2 provided on the output side of an AC generator 1, a voltage regulator 3 for controlling the AC generator 1, a storage battery 4 which is charged by the output voltage of the AC generator 1, a key switch 5 which is operated when an engine (not shown) is to be started, and a charge indicating lamp 6 connected with the key switch 5 in series and between the storage battery 4 and an indicating-lamp drive terminal a of the voltage regulator 3 for indicating that the AC generator 1 is generating electricity normally.

The AC generator 1 comprising an armature coil 101 and a field coil 102 is driven by the engine. The rectifier 2 is a full-wave rectifier which full-wave rectifies the AC output voltage of the AC generator 1. The rectifier 2 has a main output terminal 201 and a negative output terminal 202, which are rectifier output terminals for outputting a main output.

The voltage regulator 3 comprises transistors 313 and 314 as switching elements, and resistors 301 and 302, all of which constitute a power-supply drive circuit. The voltage regulator 3 further comprises a diode 311, a transistor 312, and a base resistor 303 of the transistor 312, all of which constitute a control circuit for the charge indicating lamp 6.

Further, the voltage regulator 3 comprises a resistor 304 for detecting the one-phase voltage of the AC generator 1, a smoothing capacitor 317, a Zener diode 316 for determining the one-phase voltage level of the AC generator 1, and a transistor 315 for controlling the transistor 312 based on the output of the Zener diode 316.

Also, the voltage regulator 3 comprises voltage dividing resistors 305 and 306 for dividing an output voltage of the AC generator 1 to detect the output voltage, a Zener diode 319 with its cathode connected between the voltage dividing resistors 305 and 306, a transistor 320 which is connected at its base with the anode of the Zener diode 319 and turned on and off in accordance with whether the Zener diode 319 is on or off, an output transistor 321 which is turned on and off by the transistor 320 to control the field current of the field coil 102, and a base resistor 307 of the output transistor 321. Further, the voltage regulator 3 is connected in parallel to the field coil 102 and provided with a suppression diode 322 for absorbing intermittent surges occurring in the field coil 102.

The voltage dividing resistors 305 and 306, the Zener diode 319, the transistors 320 and 321, and the base resistor 307 as a whole constitute an output-voltage regulating circuit for detecting an output voltage of the AC generator 1 and intermittently controlling a field current to the field coil 102 to regulate the AC generator output voltage to a predetermined value.

Next, the operation will be described. If the key switch 5 is closed in starting the engine, a current will flow from the storage battery 4 through the key switch 5, the charge indicating lamp 6, and the indicating-lamp drive terminal a and from the resistor 301 to the base of the transistor 313, turning the transistor 313 on. When the transistor 313 is turned on, a base current also flows through the resistor 302 to the transistor 314 to thereby turn it on, so that current is supplied from the storage battery 4 to each part. At this time, a base current flows to the transistor 312 through the resistor 303, so the transistor 312 is turned on and the charge indicating lamp 6 lights. This lighting of the charge indicating lamp 6 indicates that in this state the AC generator 1 has not yet begun to generate electricity and is in its non-generating state. If, on the other hand, the base current flows to the output transistor 321 through the resistor 307, the output transistor 321 will be turned on, so an excitation current will flow from the storage battery 4 to the field coil 102, enabling the AC generator 1 to generate electricity.

Next, if the AC generator 1 starts generating electricity after start of the engine, the one-phase voltage of the AC generator 1 will rise. This one-phase voltage is detected through the resistor 304 and smoothed by the smoothing capacitor 317. If this smoothed average voltage exceeds the Zener voltage of the Zener diode 316, the transistor 315 will be turned on and the transistor 312 will be interrupted, so the charge indicating lamp 6 will be turned off. This off state of the charge indicating lamp 6 indicates that the AC generator I has begun generating electricity normally.

Also, with the start of electricity generation by the AC generator 1, the voltage of the main output terminal 201 of the rectifier 2 will also rise. This output voltage is detected through the transistor 314 with the voltage dividing resistors 305 and 306. If that output voltage exceeds a predetermined value set by the voltage dividing resistors 305 and 306 and the Zener diode 319, the Zener diode 319 will be turned on and the transistor 320 will be turned on. If, on the other hand, that output voltage is below the predetermined value, the Zener diode 319 will be turned off and the transistor 320 will also be turned off. Thus, if the transistor 320 is turned off, the output transistor 321 is also turned off and the field current passing through the field coil 102 is turned on and off, so the output voltage of the AC generator 1 is regulated to the predetermined value. Further, any intermittent surge occurring in the field coil 102 when the field current is turned on and off is absorbed by the suppression diode 322.

Since the conventional control device of the vehicular AC generator has been constructed as described above, the transistors 313 and 314 of the power-supply drive circuit, which are switching elements, are in the shut-off state at all times and cannot supply the base current to the output transistor 321, when the charge indicating lamp 6 is broken due to vibration, long use or the like, or the indicating-lamp drive terminal a is disconnected. Therefore, since the output transistor 321 remains off at all times and the AC generator 1 is prevented from generating electricity, there was the problem that the charging of the storage battery 4 becomes impossible, the storage battery 4 finally becomes dead, and engine operation is halted.

SUMMARY OF THE INVENTION

This invention has been made to solve the conventional problems mentioned above. Accordingly, an object of the present invention is to provide a control device for a vehicular AC generator which, if the AC generator generates even a little electricity, allows the AC generator to generate electricity, and charge the storage battery, so as not to interfere with the operation of an engine even in cases where the charge indicating lamp is broken or the indicating-lamp drive terminal is disconnected.

To achieve this end, there is provided according to the present invention a control device for an AC generator having an armature coil and a field coil, the control device comprising:

a rectifier for rectifying an AC output of the AC generator, which is driven by an engine, to excite the field coil;

a storage battery adapted to be charged by the rectified output of the AC generator rectified by the rectifier for supplying power to the field coil when the engine is started;

a switching element for switching over a connecting condition of the storage battery so that the storage battery is connected through the rectifier to the field coil to supply power to the field coil when the engine is started, the switching element being connected to an AC output of the AC generator for supplying the AC output voltage of the AC generator as a drive voltage to the second switching element;

an output-voltage regulating circuit for detecting an AC output voltage of the AC generator and for intermittently controlling a field current to the field coil to regulate the AC output voltage of the AC generator to a predetermined value;

an indicating lamp connected between the switching element and the storage battery for indicating a state of electricity generation of the AC generator; and an indicating-lamp control circuit for turning on and off the indicating lamp based on the state of electricity generation of the AC generator.

With this arrangement, the drive power for the second switching element for intermittently controlling the field current can be supplied from not only the storage battery but the AC output of the AC generator, and the drive power for the second switching elements can be backed up with the AC output voltage of the AC generator.

In a preferred form of the invention, the control device for a vehicular AC generator is one that uses, as its AC output voltage, a one-phase voltage of the AC generator. With this arrangement, by using the one-phase voltage of the AC generator as its AC output, the drive power of the switching elements can be backed up with the voltage generated by the AC generator.

In another preferred form of the invention, the control device for a vehicular AC generator is one that uses, as its AC output voltage, a neutral point voltage of a three-phase Y connection AC generator. With this arrangement, by using the neutral point voltage of the three-phase Y connection AC generator as its AC output, the drive power of the switching elements can be backed up with the voltage generated by the AC generator.

The above and other objects, features and advantages of the present invention will become clear from the following detailed description of the preferred embodiments taken in conjunction with the accompanying drawings.

DETAILED DESCRIPTION OF THE PREFERRED EMBODIMENTS

Preferred embodiments of the present invention will hereinafter be described with reference to the accompanying drawings.

Embodiment 1

Figure 1:
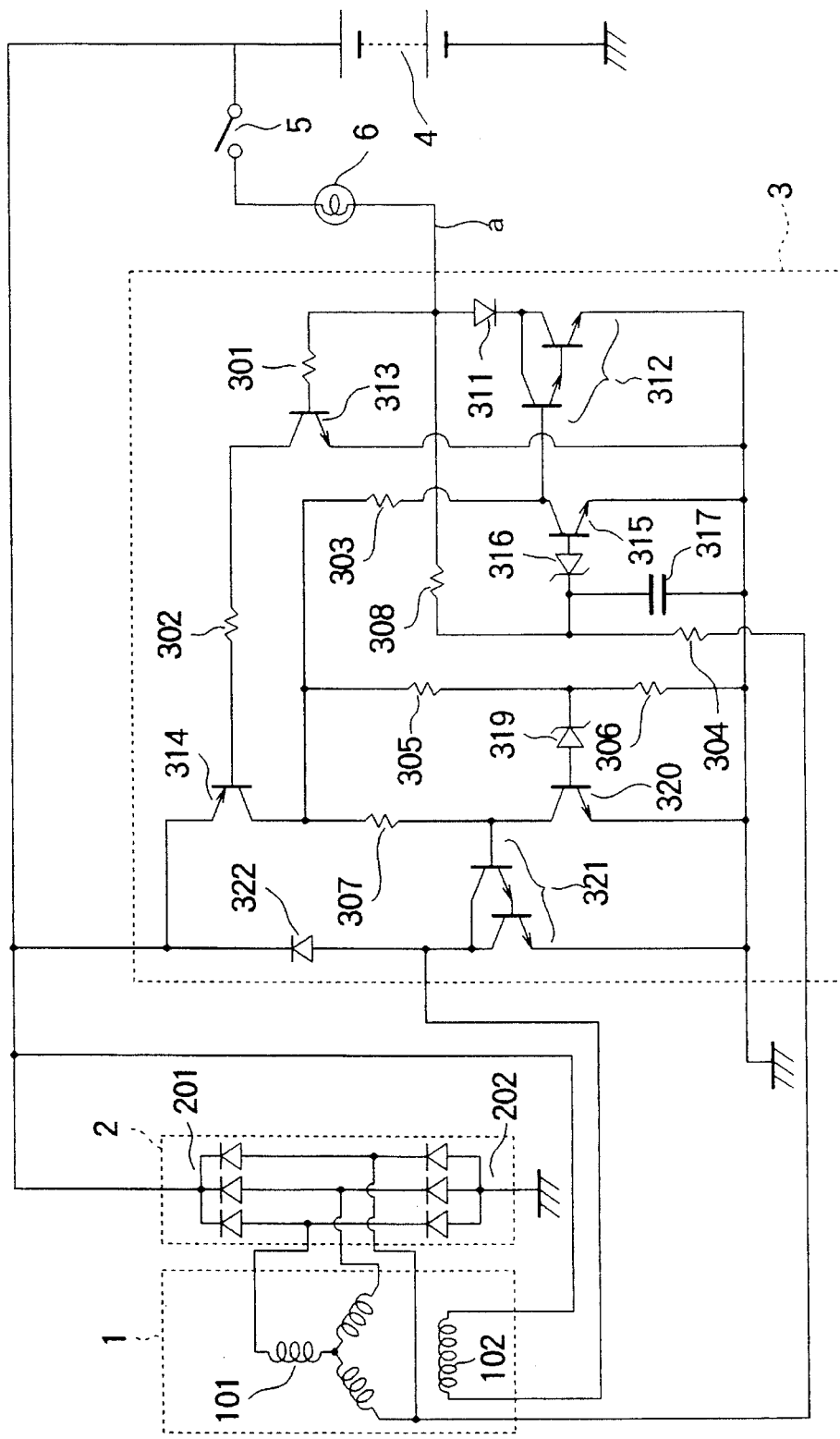
FIG. 1 is a circuit diagram showing one embodiment of the present invention.

FIG. 1 is a circuit diagram showing one embodiment of the present invention. In the figure, reference numerals 1 to 6, 101 and 102, 201 and 202, 301 to 307, 311 to 317, and 319 to 322 and reference character a are the same as in the conventional device shown in FIG. 2, so further description will not be given here. This embodiment 1 is different from the conventional device shown in FIG. 2 in that a resistor 308 is provided between a connection point of the one-phase voltage smoothing capacitor 317 and the indicating-lamp drive terminal a.

The operation of Embodiment 1 will now be described. If the charge indicating lamp 6 and the indicating-lamp drive terminal a are normal, this embodiment will operate in the same way as the above-described conventional device. If, on the other hand, the engine is started when the charge indicating lamp 6 has been broken due to vibration, prolonged use, or the like or the indicating-lamp drive terminal a has been disconnected, in the conventional device shown in FIG. 2, the power-supply drive circuit cannot be driven and the output transistor 321 remains in its off state, so the excitation current will not flow. However, in the device of Embodiment 1, if the engine is started in such a case, the rotational speed of the AC generator 1 increases and some one-phase voltage (2 to 3 V at 2,000 r.p.m.) is generated in the armature coil 101 due to the residual magnetic flux of the field coil 102 of the AC generator 1, whereby the transistors 313 and 314 of the power-supply drive circuit are turned on via the resistors 304 and 308, so a base current can be supplied to the output transistor 321. Thereafter, the power-supply drive circuit returns to normal operation, and normal electrical generation or voltage regulation is performed.

Further, even when the charge indicating lamp 6 is broken or when the indicating-lamp drive terminal a is disconnected during engine operation, the power-supply drive circuit is backed up by the one-phase voltage, so there is no interference with the operation of electricity generation or voltage regulation, and accordingly insufficient charging of the storage battery 4 or halting of engine operation can be avoided.

Embodiment 2

Figure 2:
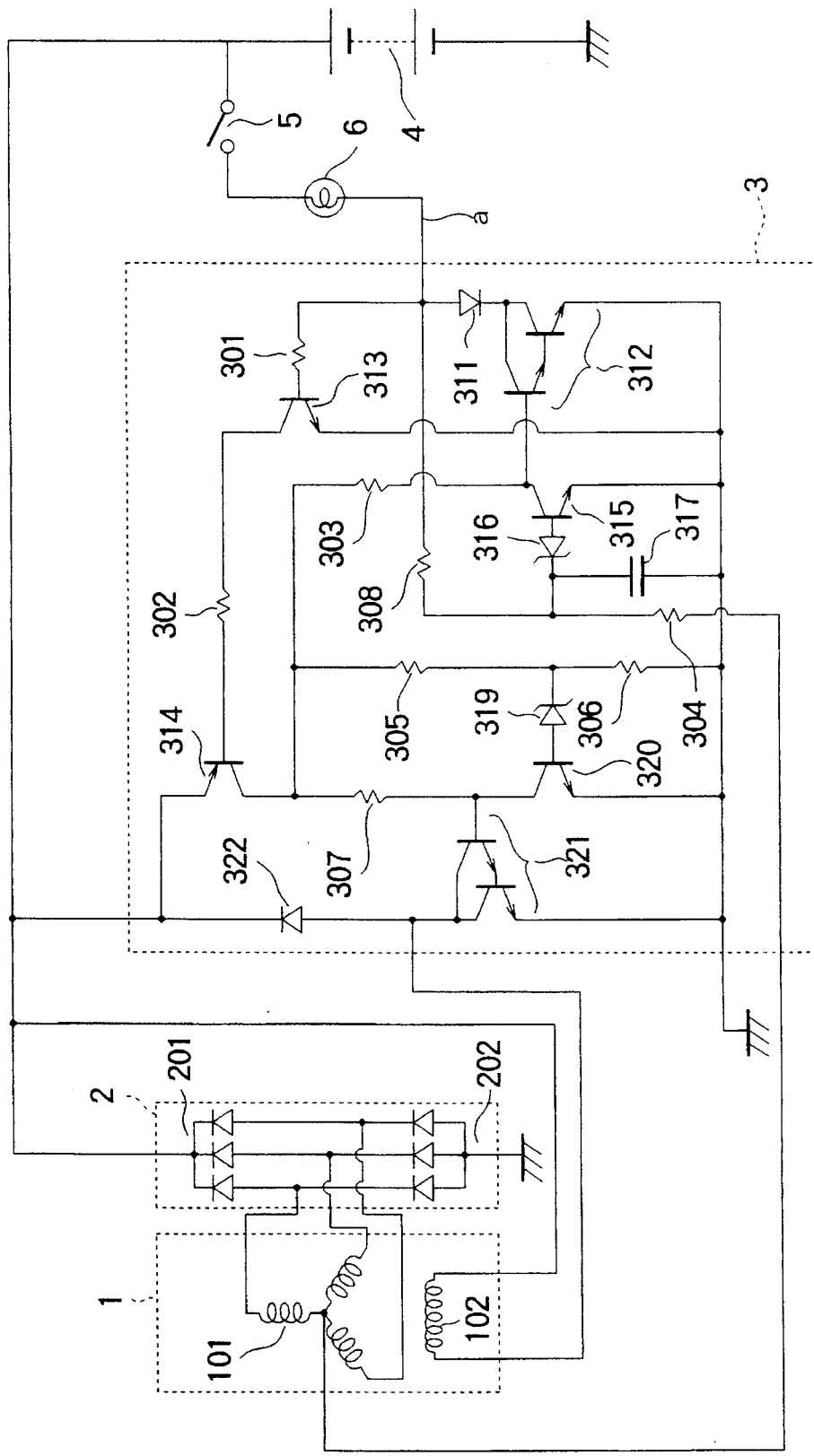
FIG. 2 is a circuit diagram showing another embodiment of the present invention.
Figure 3:
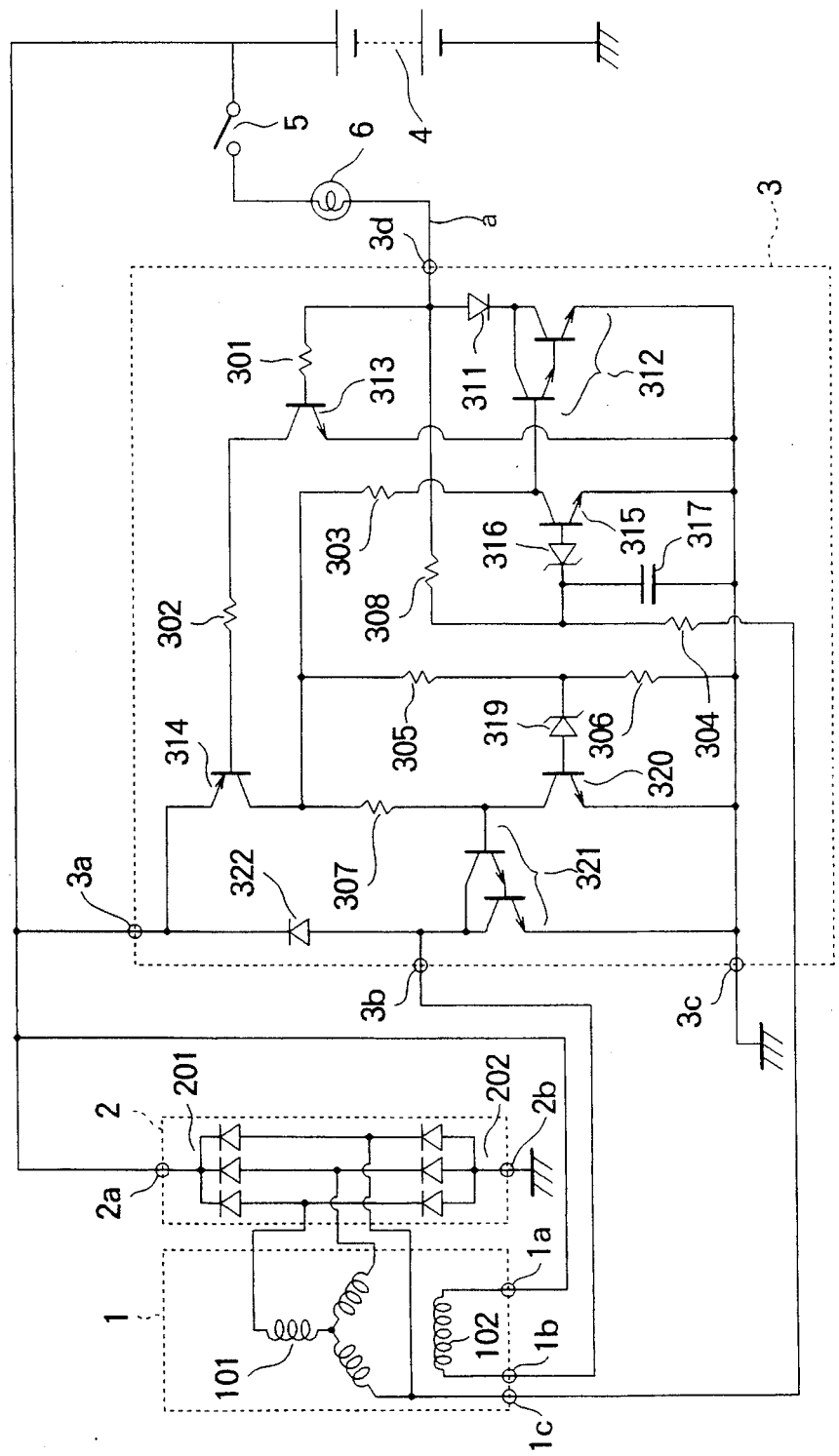
FIG. 3 is a circuit diagram of a conventional control device for a vehicular AC generator.

While in Embodiment 1 above, the power-supply drive circuit is backed up by the one-phase voltage of the armature coil 101 of the AC generator 1, it may also be backed up with the neutral point voltage of the armature coil 101, as shown in FIG. 2.

What is claimed is:

1. A control device for an AC generator having an armature coil and a field coil, said control device comprising:

a rectifier for rectifying an AC output of said AC generator, which is driven by an engine, to excite said field coil;

a storage battery adapted to be charged by the rectified output of said AC generator rectified by said rectifier for supplying power to said field coil when said engine is started;

a switching element for switching over a connecting condition of said storage battery so that said storage battery is connected through said rectifier to said field coil to supply power to said field coil when said engine is started, said switching element being connected to an AC output of said AC generator for supplying said AC output voltage of said AC generator as a drive voltage to said second switching element;

an output-voltage regulating circuit for detecting an AC output voltage of the AC generator and for intermittently controlling a field current to said field coil to regulate the AC output voltage of said AC generator to a predetermined value;

an indicating lamp connected between said switching element and said storage battery for indicating a state of electricity generation of said AC generator; and an indicating-lamp control circuit for turning on and off said indicating lamp based on said state of electricity generation of said AC generator.

2. The control device for an AC generator as set forth in claim 1, wherein said AC generator has a one-phase voltage used as said AC output voltage of said AC generator.

3. The control device for an AC generator as set forth in claim 1, wherein a neutral point voltage of the three-phase Y connection AC generator is used as said AC output voltage of said AC generator.

* * * * *